Patented Oct. 21, 1947

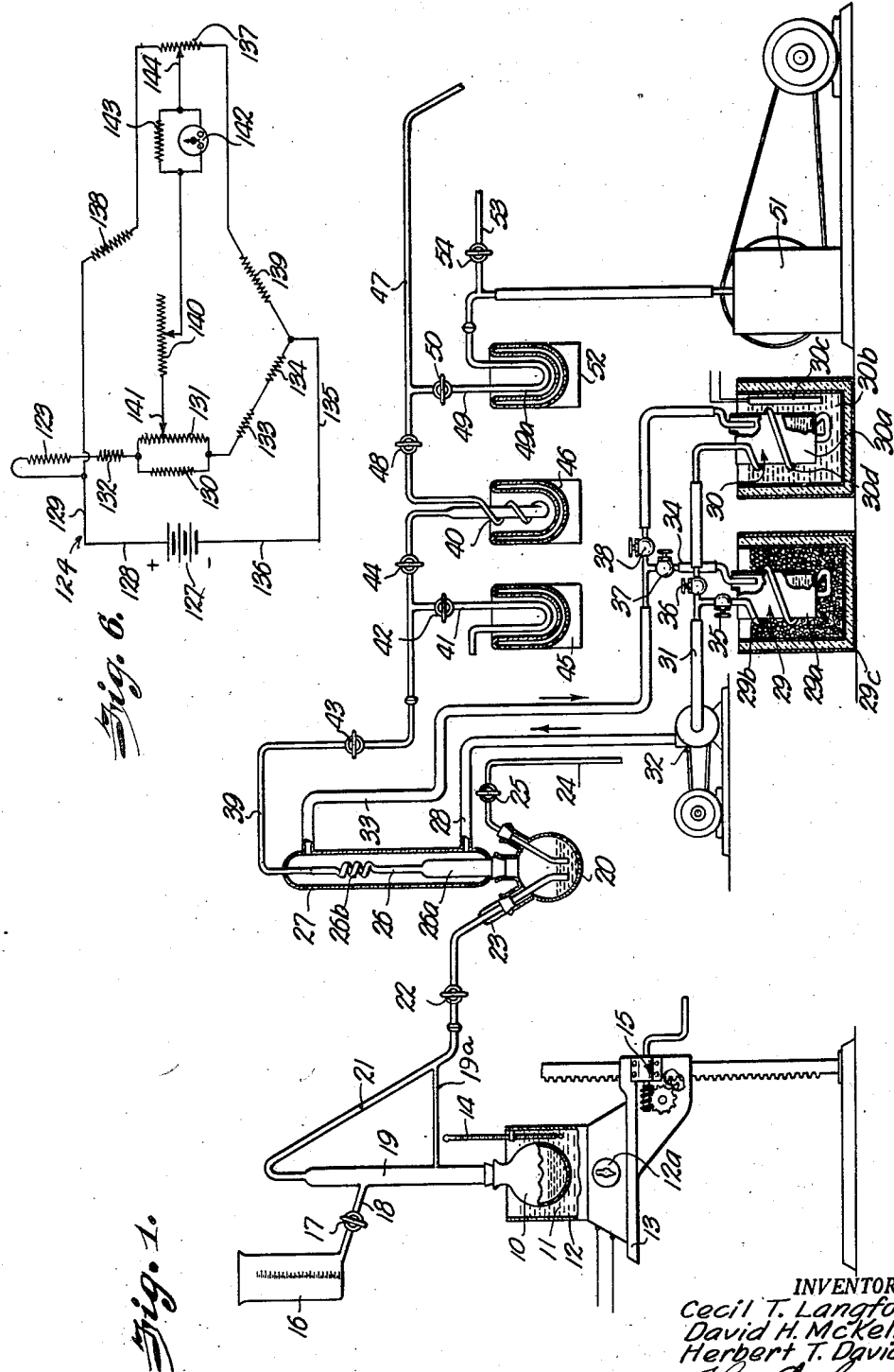

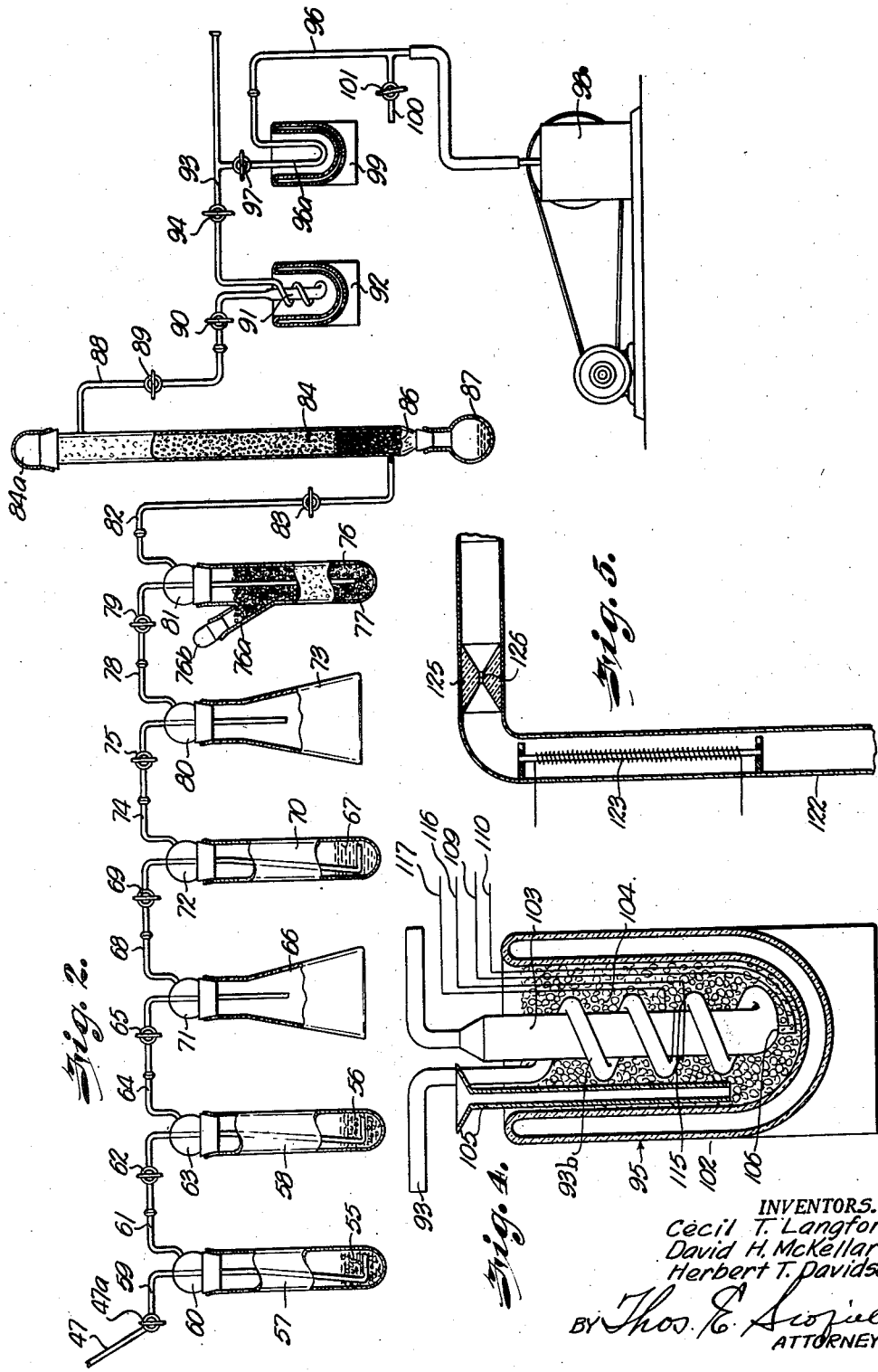

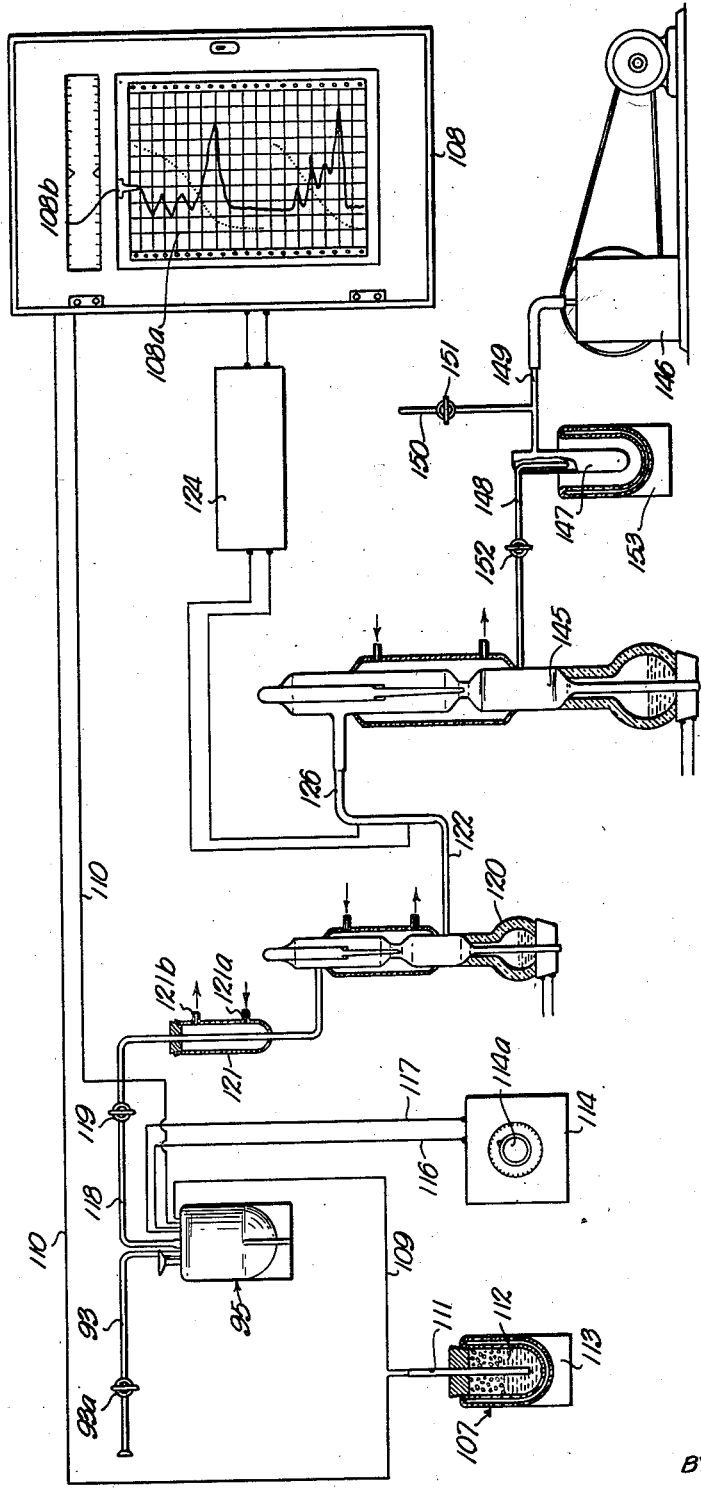

2,429,555

UNITED STATES PATENT OFFICE 2,429,555

METHOD OF AND APPARATUS FOR ANALYZING GASES AND VAPORS ABSORBED IN MATERIALS

Cecil T. Langford, Peoria, Ill., David H. McKellar, Rosita, Mexico, and Herbert T. Davidson, Ponca City, Okla.

Application August 8, 1942, Serial No. 454,110

14 Claims. (Cl. 73—27)

Our invention relates to a method of and an apparatus for removing gases and liquids from materials and analyzing the same.

Liquids and vapors from deeply buried petroleum deposits seep slowly upward through the tectonic structures overlying the deposit to the ground surface and are adsorbed in the soil. It is generally accepted that the presence and location of the petroleum deposit may be determined by analyzing samples of the soil for traces of hydrocarbons. However, since the hydrocarbons are usually present in parts per million or even parts per billion, the task of analyzing the samples is a very difficult one. Attempts are constantly being made to increase the sensitiveness of the analytical methods and apparatus.

When drilling a well it is desirable to keep a logging chart by analyzing cuttings of earth brought up with the drilling mud. If the analyses are made regularly it is possible to locate and determine the nature and probable productivity of any oil or gas formation through which the well is drilled.

Also, if the relative amount and kind of hydrocarbons in the cuttings can be accurately determined, it is possible to tell in advance when the drill is approaching an oil sand.

Also, increasing amounts of gas in the cuttings give warning that the drill is approaching a high pressure gas horizon. The drillers may then take precautions to prevent a "blowout."

It is, therefore, an important object of our invention to provide a novel and improved method and apparatus for analyzing substances for minute traces of hydrocarbons.

Although our invention is particularly adapted for use in determining the presence and location of petroleum deposits and to aid in the logging of oil wells, it operates satisfactorily in other capacities where it is desirable to test for other materials.

For instance, our method and apparatus may be used to determine the presence of water in petroleum products such as fuels, lubricants and waxes; to determine the presence of sulfur in lighter petroleum products; to determine the presence of butane and higher molecular weight hydrocarbon fractions in gases; to determine the presence and quantity of propane and lighter molecular weight hydrocarbon fractions in gasoline or to determine the presence of unsaturated hydrocarbons in petroleum products.

In addition to the above, the method and apparatus may be used in still other capacities. For instance, the apparatus may be used in the measurement of gases dissolved in water and other liquids; in the measurement of gaseous fractions which are dispersed or diffused in air or other gases; in the analysis of pure substances which have been converted to gaseous form by means of changes in physical environment or by means of chemical reaction; in the analysis of samples of air for traces of rare gases; in the detection and measurement of rare gases in petroleum, soil, or mine gases; in the detection and measurement of poisonous gases or vapors in the atmosphere of factories or places where poisonous gases may be introduced into the atmosphere; in the detection of combustible or explosive substances in the air; in the analysis of exhaust gases and vapors from internal combustion engines to determine the efficiency of the fuel combustion; in determining the presence of corrosive gases in the fuel mixture admitted to the carburetor of an internal combustion engine; in the indirect detection of substances in a sample by measuring the gases or vapors given off by the sample, either directly or during chemical reaction with other substances; in the analysis of chemicals, drugs and foods for traces of objectionable substances which are converted into gaseous form by physical or chemical means; in the measurement of vapor pressures of pure solids, solid mixtures, or other substances; or in measuring the adsorption of gases on solids.

Other and further objects are contemplated and will be apparent during the course of the following description.

In the accompanying drawings forming a part of this specification and wherein like numerals are employed to designate like parts throughout the same, Fig. 1 is a diagrammatic view illustrating the portion of the apparatus used in desorbing and collecting gases from a solid sample, Fig. 2 is a diagrammatic view of the portion of the apparatus used in purifying the collected gases, Fig. 3 is a diagrammatic view of that portion of the apparatus used to measure the gases and to record the results, Fig. 4 is an enlarged vertical sectional view of a fractionating trap forming a part of the apparatus shown in Fig. 3, Fig. 5 is an enlarged vertical sectional view of a gauge for measuring the gaseous fractions vaporized in the trap shown in Fig. 4, and Fig. 6 is a diagrammatic view of an electrical circuit forming a part of the recording apparatus.

In general the preferred embodiment of our invention contemplates desorbing gases and liquids from a sample containing hydrocarbons, passing the gases and vapors through a series of adsorbing and absorbing mediums to separate the hydrocarbon fractions in relatively pure form and then fractionally distilling the purified hydrocarbons and recording the quantity and character of each fraction.

Referring now to the drawings and particularly to Fig. 1 wherein is shown that portion of the apparatus adapted to desorb and collect the gases, the flask 10 is adapted to contain a sample to be analyzed. In order that all gases and vapors may be driven from the sample, the flask 10 is heated in an oil bath 11 in container 12. The container 12 is supported on an adjustable platform 13 which may be raised and lowered by a suitable mechanism such as the worm, worm gear and rack shown generally at 15. The oil bath 11 is heated by electrical heating elements in the base of container 12, and the amount of current delivered to the heating elements is controlled by a switch or rheostat 12a. A thermometer 14 partially immersed in the oil bath 11 permits the temperature of the bath to be accurately determined. We prefer that the oil bath 11 consist of cottonseed oil or glycerine. Any mineral oil is objectionable because, when heated, it gives off volatiles which condense in other parts of the apparatus.

When the stopcock 17 is opened, the contents of the graduated container 16 flow through tube 18 and the lower portion of the distilling reflux tube 19 into flask 10. When stopcock 17 is closed and the sample in flask 10 is heated, gases and vapors from the sample rise into the distilling reflux tube 19 and are conducted into flask 20 by tube 21 which is controlled by stopcock 22. Tube 21 is supported by a suitable brace 19a and enters flask 20 through a seal 23. Flask 20 is adapted to contain a potassium hydroxide solution through which the gases and vapors are bubbled to remove carbon dioxide gases. The portion of tube 21 within flask 20 is of an enlarged diameter so that it will not be obstructed by the potassium carbonate formed when the carbon dioxide gases contact the potassium hydroxide solution. The contents of flask 20 may be drained through a siphon tube 24 which is normally closed by stopcock 25.

A freezing column 26 surmounting flask 20 conducts the gases from the flask 20. The freezing column 26 includes an enlarged lower portion 26a and a helical shaped upper portion 26b which extend vertically through a condenser 27. Cooling fluid is introduced into the lower part of the condenser through a tube 28. Consequently, most of the water vapor in the gases leaving flask 20 will freeze in the enlarged lower portion 26a of the freezing column. The convolutions of the helical upper portion 26b consist of a series of flat spirals; that is, the respective convolutions have a small lead so that a large number of loops or turns are provided per unit of length to obtain the maximum possible contact of the gases with the tube through which it is passing. The smaller size of the upper portion of the tube as well as the nature of the convolutions therein insures that most of the water vapor in the gases will be frozen. After all of the gases have passed through the freezing column a heating medium is passed through the condenser. Ice thus melted in the freezing column gravitates into flask 20.

A cold liquid is supplied to condenser 27 from freezing bath 29 and a warm liquid is supplied from heating bath 30. A freezing medium in container 29a passes outwardly through a freezing coil 29b and is discharged into tube 31 which connects to the intake of pump 32. From the pump the medium passes through tube 28 to the condenser 27. Container 29a and freezing coil 29b are immersed in a suitable freezing bath medium 29c such as a mixture of dry ice and acetone. Tubes 33 and 34 conduct the cooling medium back to container 29a.

An extension of tube 33 enters a container 30a which holds a heating medium. Container 30a is immersed in a heating bath medium 30b which is heated by a heating element 30c. A heat exchange coil 30d extends from the bottom of container 30a and connects with tube 31. The exposed sections of coil 30d and tubes 31, 33 and 34 are suitably insulated. Valves 35 and 37 control the flow of fluid through the freezing bath 29 and valves 36 and 38 control the flow of the fluid through the heating bath 30. When valves 35 and 37 are open and valves 36 and 38 are closed, pump 32 will pump freezing fluid through condenser 27; and when valves 36 and 38 are open and valves 35 and 37 are closed, the pump 32 will pump heating fluid through the condenser.

Dehydrated gases leave the freezing column 26 and pass through tube 39 which connects with a spiral freezing trap 40. Air at atmospheric pressure may be let into the pipe 39 in advance of freezing trap 40 through a tube 41 controlled by stopcock 42. Stopcocks 42, 43 and 44 permit the flow of gases from the freezing column 26 to freezing trap 40 or outside air through Dewar flask 45 to freezing trap 40. The U-shaped portion of tube 41 below stopcock 42 may be immersed in liquid nitrogen to purify the incoming air.

Gases entering freezing trap 40 are frozen by placing a Dewar flask 46 of liquid nitrogen around the trap. When Dewar flask 46 is removed, gases in freezing trap 40 vaporize and are forced through tube 47 to the purification system shown in Fig. 2 by air introduced through tube 41. Passage of the gases through tube 47 is controlled by stopcock 48.

A branch tube 49 controlled by stopcock 50 connects tube 47 with the intake of pump 51. Tube 49 is formed with a U-shaped portion 49a which may be immersed in liquid nitrogen contained in Dewar flask 52. Trap 49a prevents water, oil vapors and other undesirable impurities generated by pump 51 from diffusing into freezing trap 40 and also prevents water and corrosive vapors in tube 47 from entering the pump. Between trap 49a and pump 51 tube 49 is provided with an air inlet tube 53 controlled by stopcock 54. When stopcock 50 is closed and stopcock 54 is open vacuum pump 51 may be started without any load being imposed upon it. After pump 51 has reached working speed the system is evacuated by closing stopcock 54 and opening stopcock 50.

Referring now to Fig. 2, tube 47 conducts the gases, vapors and sweeping air successively through two solutions of dichromic acid 55 and 56 contained in traps 57 and 58. Tube 59 which connects with tube 47 at valve 47a extends into trap 57 through cap-joint 60. The lower end of tube 59 terminates in a porous plate near the bottom of trap 57 and below the surface of acid 55. Gases and vapors entering trap 57 are bubbled through acid 55, the perforations in the plate at the lower end of tube 59 causing a fine dispersion of the gases and insuring intimate contact between the gases and acid. Unsaturated compounds and oxidizable organic vapors such as alcohols, aldehydes, cresols, etc., are removed from the gases by the acid.

After passing through trap 57, the gases are conducted by tube 61 controlled by stopcock 62 into trap 58. The perforate lower end of tube 61 terminates near the bottom of trap 58 and below the surface of the acid 56. Tube 61 enters trap 58 through a sealed cap-joint 63.

After passing from the second acid bath 56 the gases traverse a tube 64 controlled by stopcock 65 and enter safety flask 66 through a sealed cap-joint 71. Safety flask 66 prevents acid which foams over from trap 58 from passing to other parts of the system. Any acid that foams up and passes through tube 64 is collected in safety flask 66.

From safety flask 66 the gases pass through a tube 68 controlled by stopcock 69 into a saturated solution of potassium hydroxide 67. Tube 68 passes through cap-joint 72. The lower end of tube 68 terminates in a perforated plate which causes the gases to bubble through the potassium hydroxide solution in a finely dispersed state. The potassium hydroxide solution absorbs carbon dioxide and sulfur dioxide from the gases.

From trap 70 the gases pass through a tube 74 controlled by stopcock 75 and enter a safety flask 73 which catches any of the potassium hydroxide solution that may be carried over with the gases.

From the safety flask the gases are carried by a tube 78 controlled by stopcock 79 into a trap 77 filled with solid lumps of potassium hydroxide 76. Safety flask 73 and trap 77 are provided with sealed cap-joints 80 and 81, respectively. Trap 77 has a lateral neck 76a which is normally closed by plug 76b. After joint 81 has been sealed lumps of potassium hydroxide are introduced into the trap through neck 76a. As the gases rise through the pieces of potassium hydroxide, water vapor is adsorbed and the substantially dehydrated gases passed through tube 82 controlled by stopcock 83 into the lower end of a vertical column 84.

The lower portion of column 84 is filled with glass beads and the upper portion of the column is filled with a mixture of glass beads and phosphorus pentoxide. The glass beads are supported by a plug of glass wool 86 in the lower end of the column. As the gases rise in column 84 the last trace of water is absorbed therefrom and phosphoric acid formed flows down and accumulates in flask 87. The glass beads and phosphorus pentoxide may be introduced into the column by removing cover 84a.

The thoroughly dehydrated gases leave column 84 through tube 88 which is controlled by stopcocks 89 and 90 and enter a spiral freezing trap 91. A Dewar flask 92 filled with liquid nitrogen is moved to a position around the trap to freeze the gases. When Dewar flask 92 is removed the gases are vaporized and passed through tube 93 controlled by stopcock 94 to an analytical freezing trap 95 shown in Fig. 3. Valves 90 and 94 may be closed to hold the vapors in freezing trap 91 even after they have been vaporized.

Tube 96 controlled by stopcock 97 branches from tube 93 and connects with the intake of a suction pump 98. U-shaped trap 96a is normally surrounded by Dewar flask 99 containing liquid nitrogen to prevent corrosive vapors in line 93 from entering pump 98 and to prevent oil and other gases in the pump from having access to line 93. An air inlet tube 100 between trap 96a and pump 98 is controlled by a stopcock 101 and permits the pump 98 to be started without a load being imposed upon it. Thereafter, stopcock 101 is closed and stopcock 97 is opened to permit the purification system to be evacuated.

The gases entering analytical freezing trap 95 comprise hydrocarbons, nitrogen and oxygen. In the freezing trap the condensable hydrocarbon fractions condense and the uncondensed nitrogen, oxygen and hydrocarbon gases pass through the trap.

The trap, shown in detail in Fig. 4, comprises a Dewar flask 102 into which the helix shaped lower end 93b of tube 93 extends. The helix 93b connects with the lower end of a substantially larger tube 103 arranged vertically within Dewar flask 102. Pieces of twenty mesh zinc metal 104 are packed around helix 93b and tube 103. Zinc is used because of its relatively high heat capacity per unit volume at low temperatures. Liquid nitrogen may be poured into the Dewar flask 102 through funnel 105.

When the trap is chilled to the temperature of liquid nitrogen (approximately −200° C.) all of the hydrocarbon gases condense in the helix shaped portion 93b. If the temperature of the trap is then permitted to slowly rise, the hydrocarbon fractions will fractionally distill through tube 103. The coldest portion of the analytical freezing trap 95 is at the bottom thereof. The lowest boiling fraction will vaporize first and the other fractions will move downwardly in the trap and recondense, thus assuring substantially complete separation of the vaporized fractions.

The variable thermocouple junction 106 at the bottom of tube 103 and the reference junction in flask 113 of a copper-constantan thermocouple assembly 107 are connected through a recording potentiometer 108 by conductors 109 and 110. This arrangement makes it possible to measure the exact temperatures at which the gases in the analytical trap 95 vaporize and to record this temperature on the moving strip 108a of the recording potentiometer 108. The recording potentiometer 108 is a single-range, two-point recording potentiometer, of the type conventional in the art and the copper-constantan thermocouple is the conventional type comprising a glass tube 111 filled with transformer oil and adapted to be partially immersed in a cracked ice-water mixture 112 in Dewar flask 113 and a variable junction 106.

When it is desired to remove all gases from the analytical freezing trap 95, the switch 114a of transformer 114 is turned to the "on" position. A heating element 115 wrapped around the tube 103 is electrically connected to the transformer 114 by conductors 116 and 117. Manipulation of control switch 114a permits varying amounts of current to be passed through the heating element 115.

Gases flowing out of analytical freezing trap 95 pass through tube 118 controlled by stopcock 119 to the suction side of a mercury vapor pump 120. A portion of tube 118 passes through a water cooled condenser 121 which prevents mercury vapor from pump 120 from passing back into analytical trap 95. A water inlet tube (not shown) is connected to the nipple 121a and a water outlet tube (not shown) is connected to the nipple 121b.

The gases are discharged under pressure from pump 120 into a tube 122 an enlarged view of which is shown in Fig. 5. A hot wire filament 123, disposed longitudinally within tube 122, is electrically connected to the recording instrument 108 through a Wheatstone bridge circuit. The Wheatstone bridge circuit is shown generally by the numeral 124 in Fig. 3 and in detail in Fig. 6. As best shown in Fig. 5, the filament 123 is disposed in a vertical portion of tube 122 and immediately above the filament the tube bends to a horizontal position. The orifice 126 is mounted in the horizontal portion of the tube 122 to prevent stoppage of the orifice by accumulation of mercury. The small dimensions of orifice 126 cause gases in tube 122 to build up a pressure around filament 123. The amount of pressure built up by the gases will depend upon the amount of gas in the tube and the diameter of the orifice 126. Consequently the diameter of the orifice may be varied to regulate the sensitiveness of the apparatus to a relatively small amount of gas. The filament 123 is part of the Wheatstone bridge circuit 124. As each gas fraction passes through tube 122 its presence is recorded by instrument 108. Each fraction takes heat from filament 123 and unbalances the Wheatstone bridge circuit. This causes the recording needle 108b of the instrument to swing to one side thus indicating graphically the presence and concentration of the fraction in tube 122.

The Wheatstone bridge circuit, shown in detail in Fig. 6, is one example of a circuit which is usable in the apparatus. It operates from a small storage battery 127. The positive terminal of battery 127 is connected to filament 123 by conductors 128 and 129. This filament 123 has a resistance of 8.2 ohms at 26° C. In operation its temperature is approximately 250° C. and at that temperature its resistance is 15.5 ohms. Filament 123 is connected in series to a resistance 132 of 5 ohms which, in turn, is connected to parallel resistances 130 and 131. Resistance 130 is 5 ohms and resistance 131 is 250 ohms. The parallel resistances 130 and 131 are connected to the negative terminal of battery 127 through series resistances 133 and 134 by conductors 135 and 136. Resistance 133 is 5 ohms and resistance 134 is 13.5 ohms.

Conductor 129 is also connected to the slide wire rheostat 137 of the recorder 108 through a series resistance 138 of 30 ohms. Conductor 135 is also connected to the slide wire rheostat 137 through a series resistance 139 of 32 ohms. Resistance 140 is electrically connected to resistance 131 by an adjustable contact 141. Resistance 140 is in series with the galvanometer 142 of the recorder 108. The recorder has a resistance 143 of 20 ohms in parallel with it. In series with the galvanometer 142 is a contact 144 along which moves the slide wire rheostat 137 when the circuit is unbalanced. The recording pen 108b is operated by virtue of the relative movement of the slide wire and the contact 144.

Gases flowing through tube 122 absorb heat from filament 123 thus causing a drop in resistance. When the resistance is reduced the Wheatstone bridge circuit is unbalanced causing the slide wire rheostat to travel with respect to contact 144 in a direction to balance the circuit.

The circuit shown in Fig. 6 is particularly adaptable to this apparatus since its sensitivity can also be increased by varying the size of resistances 138 and 139. As these resistances are made larger the necessary displacement between rheostat 137 and contact 144 becomes greater in order to obtain sufficient voltage to balance galvanometer 142. Thus by increasing resistances 138 and 139 the device may be made to record smaller amounts of gas in tube 122. The adjustable contact 141 may be moved along resistance 131 to adjust the initial position of terminal 144 on the slide wire rheostat 137.

After the gases pass through orifice 126 they are exhausted from the system by pumps 145 and 146. Freezing trap 147 is interposed in tube 148 to remove transient mercury. The freezing trap 147 communicates with the suction side of pump 146 through tube 149. Into tube 149 is connected an air inlet tube 150 having a stopcock 151. After pump 146 is started stopcock 151 is closed and stopcock 152 in tube 148 is opened to cut the pump into the system.

In carrying out our invention with the apparatus above described a quantity of saturated potassium hydroxide solution is poured into flask 20. At first it is desirable only to evacuate the desorbing and collecting portion of the apparatus illustrated in Fig. 1. Before pump 51 is started stopcock 50 is closed and stopcock 54 is opened. Pump 51 may then be started without any substantial load being imposed upon it. As soon as pump 51 attains working speed, a Dewar flask of liquid nitrogen 52 is placed around trap 49a; stopcock 54 is closed and stopcock 50 is opened. Stopcocks 43, 44 and 48 were previously opened and stopcocks 22, 25, 42, and 47a were previously closed. Thus, pump 51 may now evacuate all of the system between stopcocks 22 and 47a.

Pump 32 is next started with valves 36 and 38 closed and valves 35 and 37 open so that freezing liquid from bath 29 can be circulated through condenser 27. Freezing trap 40 is also immersed in liquid nitrogen contained in Dewar flask 46.

A measured quantity of soil or other material having gases adsorbed on it or dissolved in it is then placed in flask 10. As soon as the sample has been placed in the flask, stopcock 17 is closed and stopcock 22 is opened. The thermostatically controlled oil bath 11, heated to a temperature of approximately 100° to 110° C. is then raised to partially submerge flask 10. As the soil sample becomes heated, a 19 per cent solution of hydrochloric acid from graduated container 16 is slowly permitted to flow into flask 10. A sufficient quantity of the acid is added to neutralize the alkalinity of the soil sample. After the soil sample has been neutralized, an additional 50 cubic centimeters of the acid is introduced into flask 10.

In all instances where the sample is a solid 1 cubic centimeter of ethylene glycol per gram of sample is also added. The ethylene glycol insures fluidity of the mixture and disintegration of any lumps that may be present.

Heating the sample causes a "steam distillation." A heating period of twenty minutes is usually sufficient to drive all of the gases and vapors from the sample. The gases and vapors from the sample rise into the distilling reflux tube 19 and pass through tube 21 into flask 20 where they are bubbled through the concentrated potassium hydroxide solution. The carbon dioxide in the gases reacts with and precipitates in the potassium hydroxide as potassium carbonate. Part of the water is also removed by the potassium hydroxide solution. The rest of the water vapor is frozen when the gases and vapors pass through freezing column 26. After passing through the freezing column, the gases are conducted by tube 39 into freezing trap 40 where the pertinent sample gases are frozen.

Stopcock 22 is then closed and stopcock 17 is opened. Pump 32 is stopped long enough to permit the freezing liquid to flow out of condenser 27. As soon as all of the freezing liquid has run back into the freezing bath 29, valves 35 and 37 are closed and valves 36 and 38 are opened. Pump 32 is then started again. Heating fluid from the heating bath 30 is now pumped through condenser 27. Circulation of the heating fluid will melt any substance that has been frozen in freezing column 26. When the frozen substances melt, they flow into the potassium hydroxide solution in flask 20.

As soon as the freezing column 26 has been cleared of the frozen substances, a Bunsen burner or other source of heat is applied to flask 20 until its contents boil gently. While boiling the contents of flask 20, heating fluid is permitted to circulate through condenser 27 to prevent further condensation in the column 26. The contents of flask 20 are heated for several minutes to free final traces of gases in the solution. The gases pass on to freezing trap 40.

After the boiling has continued for a minute or two the stopcocks 44, 48, and 50 are closed, stopcock 54 is opened and pump 51 is stopped. The vacuum in the system up to stopcock 44 is then released by opening stopcock 22.

Pump 32 is stopped permitting the heating fluid to drain out of condenser 27, and the Dewar flasks 46 and 52 are removed from traps 40 and 49. The gases frozen in trap 40 are then permitted to rise to room temperature.

After the gases in trap 40 are sufficiently warmed Dewar flask 45 is placed around trap 41. The gases in trap 40 may be swept into the evacuated purification system illustrated in Fig. 2 by closing stopcock 50 and opening stopcocks 42, 44, 48, and 47a. Stopcock 42 is adjusted to permit a regulated flow of air to pass through trap 41. The air flows into tube 39 and through trap 40 sweeping the gases through tube 47 and into trap 57. The liquid nitrogen around trap 41 freezes out of the incoming air undesirable fractions, such as water and carbon dioxide.

In the purification system illustrated in Fig. 2 the hydrocarbons in the gas sample are purified by passing the sample through a system of gas washing bottles containing adsorbing or absorbing solutions or solids.

Before opening stopcock 47a, pump 98 is started and stopcock 101 is closed. Dewar flasks 92 and 99, filled with liquid nitrogen, are brought up around traps 91 and 96a, and stopcocks 62, 65, 69, 75, 79, 83, 89, 90, 94 and 97 are opened. Stopcock 93a is closed.

The gas sample from trap 40 and the sweeping air are admitted into the purification system as fast as possible without causing the solutions in the bottles to foam over. The gases and sweeping air pass first through the dichromic acid solutions in traps 57 and 58 which remove unsaturated compounds as well as oxidizable compounds such as alcohol, aldehydes, cresols, etc. If the gases are admitted into the purification system too rapidly, the dichromic acid solutions foam over. However, if this should occur, the excess acid is collected in safety flask 66.

After passing through safety flask 66, the gases enter the saturated potassium hydroxide solution in trap 70. Carbon dioxide fractions and sulfur dioxide fractions are removed from the gases by the potassium hydroxide solution in trap 70. Safety flask 73 collects any of the potassium hydroxide solution carried over by the gases. The gases next flow through the solid potassium hydroxide in trap 77 where water vapors and traces of carbon dioxide and sulfur dioxide are removed. From trap 77 the gases flow through tube 82 into the bottom of column 84. As the gases arise around the lumps of phosphorus pentoxide and glass beads, most of the remaining water is removed from the sample. We have found it necessary to intermix the beads and phosphorus pentoxide to prevent the formation of an impenetrable mass. The phosphoric acid formed gravitates downwardly and accumulates in flask 87.

As previously explained, the lower portion of column 84 is entirely filled with the glass beads. The beads become wet with the phosphoric acid as it accumulates. After these beads become wet, the gases entering column 84 lose a portion of the water vapor by contact with the phosphoric acid on the glass beads, thus conserving the phosphorus pentoxide. The gases leaving column 84 comprise the hydrocarbon fractions originally present in the soil sample and gases such as oxygen that are non-condensable at the temperature of liquid nitrogen.

The gases leave the upper end of column 84 through tube 88 and are collected in freezing trap 91. After the gases have been accumulated in trap 91, stopcocks 97, 94, 90, and 47a are closed, stopcock 101 is opened and pump 98 is stopped. The jars of liquid nitrogen 92 and 99 are then removed from traps 91 and 96a. The gases confined in freezing trap 91 warm to room temperature but are temporarily confined between stopcocks 90 and 94.

Before releasing the gases from trap 91 the fractionating, metering and recording system illustrated in Fig. 3 is prepared by circulating cooling water through condenser 121 and through condensers on pumps 120 and 145. Mercury vapor pumps 120, 145 and vacuum pump 146 are started. All of the valves in the fractionating, metering and recording system are opened except valve 93a. When valve 151 is closed the system will be evacuated by pump 146 back as far as valve 93a. The mercury vapor trap 147 is immersed in liquid nitrogen contained in Dewar flask 153 and junction 111 is immersed in a cracked ice and water mixture 112.

When the position of indicator 108b shows that the pressure in the system is approximately $10^{-5}$ or $1/100,000$ of a millimeter of mercury, stopcock 93a is opened to allow any gas between stopcock 94 and stopcock 93a to be carried out through the system. A pressure of precisely $10^{-5}$ millimeters of mercury is not necessary but a pressure of the order of $10^{-3}$ to $10^{-6}$ millimeters of mercury is required.

When no gas is flowing through the system of Fig. 3, the pressure therein remains constant at the lowest pressure pumps 145 and 146 will attain. When this pressure exists in the system, pointer 108b is positioned near the left margin of chart 108a. This position serves as a base or reference for subsequent increases of pressure caused by the presence of gases in the system.

The effect which temperature changes in filament 123 have on the circuit 124 has been hereinabove explained. The following relations exist between temperature changes and the pressure within the system.

A vacuum or a space devoid of gases is a good insulator. Conversely, through the phenomenon of thermal conductivity gases are able to transfer heat either by conduction or convection from an object at an elevated temperature to another at a lower temperature. The thermal conductivity of a mixture of gases depends upon the physical and chemical nature of the gases. But the thermal conductivity of any one gas is a function of the pressure under which the gas is confined. Since the minimum pressure produced within tube 122 and around filament 123 by pumps 145 and 146 is a constant pressure, the amount of heat transferred per unit of time from filament 123 to the walls of tube 122 by means of thermal conductivity is a constant amount. Therefore, in the absence of extraneous substances in the tube 122, there is no change in the temperature of filament 123, and hence no change in its resistance. This being true, there will be no change in the balanced condition of circuit 124 of which pen 108b is a part. As suggested, pen 108b occupies a position adjacent the left margin of chart 108a as long as no gas enters tube 122. Pen 108b thus indicates a pressure which is not necessarily a known pressure, but the pressure sought in the operations since it is the minimum pressure attainable by the specific pumps and therefore a constant pressure.

If it should be desired to measure the exact pressure within the system at the minimum point, or of the pressure corresponding to the position of pen 108b at any selected distance from the left margin on chart 108a, a McLeod gauge or other suitable pressure gauge may be connected in the system. After calibrating the circuit 124 and the movement of pen 108b against the absolute pressure gauge, the position of the pen may be subsequently used as an absolute pressure indicator.

Interpretation and calculation of the amounts of each gas as shown on chart 108a is effected by reference to a calibration curve obtained by passing a known amount of any selected gas through the system, measuring the area of its showing on the chart, and plotting this area against the amount of the gas passed through the system. This, of course, may be done without knowing the exact pressures in the tube 122.

When gas is admitted to the system it accumulates before orifice 126, Fig. 5, until it can flow therethrough. The pressure resulting at this point is dependent upon the amount of the gas; the thermal conductivity depends on the pressure of the gas; the heat loss from filament 123 to tube 122 depends upon the thermal conductivity; the heat loss from filament 123 determines its temperature; the temperature of filament 123 determines its resistance and the resistance of filament 123 determines the position of pen 108b on chart 108a. Therefore, the position of pen 108b on the chart is an indication of the amount of gas in tube 122. The movement of pen 108b across the chart is a measurement of the amount of heat absorbed from the filament 123 by the gas and this movement may be used as an index of the quantity of gas passing over the filament.

Analytical trap 95 is now cooled to approximately −200° C. by pouring a slight excess of liquid nitrogen into Dewar flask 102. Stopcock 94 is opened and stopcock 119 is partially closed to prevent the gas sample from passing through analytical trap 95 at too great a velocity for proper freezing of the condensable fractions. The condensable hydrocarbon fractions of the gas solidify in the analytical trap 95 and the non-condensable fractions such as nitrogen and oxygen pass through the trap and are carried out of the system. The temperature of analytical trap 95 at the junction 106 is continuously recorded by indicator 108b.

As soon as the condensable and non-condensable gases have been separated, the temperature of analytical trap 95 is permitted to slowly rise to fractionally distill the condensed hydrocarbons. It will be observed that the analytical trap is uniquely constructed so that the fractions separate in the order of their freezing points when they enter the trap. As the temperature of the trap slowly rises to the vaporizing temperature of each fraction, that fraction passes into the system through tube 118.

The bottom of trap 95 in proximity to junction 106 is the coldest part of the trap and each fraction must pass the junction as it passes from the trap. When the temperature of the trap around junction 106 rises sufficiently to permit the lowest boiling hydrocarbon fraction to pass into tube 118, the higher boiling fractions in the warmer upper regions of the trap vaporize and move down into the colder portion of the trap where they recondense. The recondensing of the higher boiling fractions obtains a more complete separation of the fractions than would otherwise be possible. The fraction passing into tube 118 is drawn by pump 120 rapidly into tube 122 for analysis, before the next highest boiling fraction vaporizes. Thus, as each hydrocarbon fraction vaporizes it is drawn through the system by mercury vapor pump 120. The pump discharges each fraction into pipe 122 and literally pushes it against the orifice 126, thereby momentarily creating an increased pressure in front of plug 125 and around the resistance element 123. The increased pressure enables smaller amounts of gas to conduct a measurable amount of heat from filament 123. As hereinabove explained, absorption of heat from filament 123 decreases its resistance and unbalances the Wheatstone bridge circuit 124, thus causing recorder 108b to swing to one side and graphically record the presence of the gas fraction in tube 122. The temperature at which the fraction distills from analytical trap 95 is recorded through the medium of thermocouple assembly 107.

The sensitiveness of the system is greatly enhanced by placing the booster pump 120 between analytical trap 95 and orifice 126. The booster pump 120 not only creates a relatively high pressure around filament 123, thus increasing the amount of heat absorbed from the filament, but it also causes the gas fractions to be carried more rapidly out of the system and thus prevents the different fractions from intermingling. Also pump 120 maintains a constant low pressure in trap 95 so that vaporization of any one fraction will not be retarded to a higher temperature by pressure of the preceding fraction in trap 95.

After each fraction of the sample that is significant to the analysis is carried through the system and a record obtained of its quantity in the system and the temperature at which it distilled, the remaining substances are expelled from analytical trap 95 by operating the transformer switch 114a to heat coil 115.

As clearly shown in Fig. 3 the strip 108a carries two curves. One curve designates the temperature of analytical trap 95 at junction 106. The other curve indicates the passage of each fraction around filament 123.

Although in the specification, the heat absorbed from filament 123 by the individual gases being tested is reflected on the record, it is contemplated as well that the quantitative analysis may be made by observing and recording the heat given up by individual gases to the filament.

While the foregoing disclosure applies more specifically to the analysis of hydrocarbon gases, it is obvious that the method is of use in analyzing other gases and such is contemplated in our invention. The application of our method and combination of equipment is not limited by the specific temperatures, pressures and details of apparatus construction illustrated. Many variations may be made to conform to requirements needed in analyzing other gases of different physical-chemical characteristics; such variations come within the scope of our invention.

For example we contemplate the use of:

1. Different chemicals to "strip" gases from a solid or liquid sample.
2. Different reagents to remove gases other than $CO_2$ from sample gases in flask 20.
3. Chemical methods of removing $H_2O$ from samples, instead of freezing as in column 26.
4. Different temperatures and pressures in flask 10 to remove gases from solids or liquids.
5. Gases other than air admitted through 41—42 to sweep sample into system of Fig. 2.
6. Chemical or other means of purification of gases entering through 41—42 (other than freezing).
7. Admission of gaseous sample directly into purification system of Fig. 2, eliminating stripping operation.
8. Use of other chemicals in traps of Fig. 2 to achieve such purification as may be needed in any specific sample.
9. Different pressures and temperatures as may be chosen to carry a gas sample through the purification system of Fig. 2.
10. Different temperature and pressure as may be most suitable for any gas sample retained in or passing through trap 95.
11. Use of heating or cooling means other than liquid nitrogen and electricity in order to obtain proper temperature of trap 95.
12. Recording, or not recording, temperature on 108 as may be desired for any given gas or gaseous mixture.

It may thus be seen that we have accomplished the objects of our invention. We have provided a novel, expeditious and accurate method of desorbing, purifying and recording each hydrocarbon fraction present in a given sample of material. The entire operation may be conducted in approximately two hours and the apparatus is accurate in measuring one part of hydrocarbon material in one hundred million parts of the sample material.

It will be understood that certain features and subcombinations are of utility and may be employed without reference to other features and sub-combinations. This is contemplated by and is within the scope of the claims. It is further obvious that various changes may be made in details within the scope of our claims without departing from the spirit of our invention. It is, therefore, to be understood that our invention is not to be limited to these specific details shown and described.

Having thus described our invention, we claim:

1. A method of gas analysis including the steps of separating the gases from related materials, collecting the gases, separately releasing the respective constituents of the collected gases, passing each constituent separately through a thermal transfer zone, and determining the quantity of each constituent as it passes through the zone by bringing said constituent in heat exchange relation with a heated element and measuring the heat absorbed from the element by said constituent as an index of the quantity of each constituent of the gas passing over said element.

2. A method of analyzing gases in a liquid comprising the steps of extracting the gases from the liquid at elevated temperature and under reduced pressure, collecting the extracted gases in a freezing bath, purifying the gases by using an easily isolated inert gas to sweep it through selected reagents, separating the purified gas into separate constituents in the order of their boiling points, passing each constituent separately through a thermal transfer zone wherein it is brought in heat exchange relation with a heat responsive recording means, and measuring the heat exchange between the constituents and the recording means as an index of the quantity of the constituents passed through the said zone.

3. A method of analyzing gaseous hydrocarbon materials including the steps of separating the hydrocarbon fractions from related gaseous materials, condensing the hydrocarbons at approximately the temperature of liquid nitrogen, increasing the temperature of the condensed hydrocarbons to distill vaporizable fractions, determining the temperature at which each fraction distills, separately passing each fraction under pressure through a heating zone, and measuring the heat transmitting property of each of said vaporized fractions.

4. A method of analyzing a gas for traces of hydrocarbons including the steps of separating the hydrocarbon fractions from other gaseous materials, condensing the hydrocarbons in a freezing zone having a region of maximum coldness, gradually warming the freezing zone to progressively vaporize the hydrocarbon fractions, the lowest boiling fraction passing through the freezing zone when the region of maximum coldness warms sufficiently to permit it to pass as a vapor and the higher boiling fractions recondensing, recording the temperature at which each fraction leaves the freezing zone, passing the vaporized fractions through a heating zone, and determining the quantity of each such fraction by recording the heat absorbed by the said vaporized fractions.

5. A method of analyzing a gas for traces of hydrocarbons including the steps of separating the hydrocarbon fractions from other gaseous materials, condensing the hydrocarbons in a freezing zone having a region of maximum coldness, gradually warming the freezing zone to progressively vaporize the hydrocarbon fractions, the lowest boiling fraction passing through the freezing zone when the region of maximum coldness warms sufficiently to permit it to pass as a vapor and the higher boiling fraction recondensing, recording the temperature at which each fraction leaves the freezing zone, separately passing each fraction under pressure through a heating zone, and determining the quantity of each such fraction by recording the heat absorbed by the said vaporized fractions.

6. A method of analyzing a gas for traces of hydrocarbons comprising separating the hydrocarbon fractions from other gaseous materials, said step including passing the mixed gases vertically in a helical path, the convolutions of the path having a relatively small lead and located in a freezing zone so that water vapor is frozen out, condensing the hydrocarbons at approximately the temperature of liquid nitrogen, increasing the temperature of the condensed hydrocarbons to distill vaporizable fractions, recording the temperature at which each fraction distills, passing the vaporized fractions through a heating zone, and recording the heat absorbed by the said vaporized fractions as an index of the quantity of the constituents passed through the zone.

7. A method of analyzing a gas for traces of hydrocarbons comprising separating the hydrocarbon fractions from other gaseous materials, said step including passing the mixed gases vertically in a helical path, the convolutions of the path having a relatively small lead and located in a freezing zone so that water vapor is frozen out, condensing the hydrocarbons at approximately the temperature of liquid nitrogen, increasing the temperature of the condensed hydrocarbons to distill vaporizable fractions, recording the temperature at which each fraction distills, separately passing each fraction under pressure through a heating zone, and recording the heat absorbed by the said vaporized fractions as an index of the quantity of the constituent passed through the zone.

8. A method of analyzing a gas for traces of hydrocarbons comprising separating the hydrocarbon fractions from other gaseous materials, said step including passing the mixed gases vertically in a helical path, the convolutions of the path having a relatively small lead and located in a freezing zone so that water vapor is frozen out, condensing the hydrocarbons in a freezing zone having a region of maximum coldness, gradually warming the freezing zone to progressively vaporize the hydrocarbon fractions, the lowest boiling fraction passing through the freezing zone when the region of maximum coldness warms sufficiently to permit it to pass as a vapor and the higher boiling fractions recondensing, recording the temperature at which each fraction leaves the freezing zone, passing the vaporized fractions through a heating zone, and recording the heat absorbed by the said vaporized fractions to determine its quantity.

9. A method of analyzing a gas for traces of hydrocarbons comprising separating the hydrocarbon fractions from other gaseous materials, said step including passing the mixed gases vertically in a helical path, the convolutions of the path having a relatively small lead and located in a freezing zone so that water vapor is frozen out, condensing the hydrocarbons in a freezing zone having a region of maximum coldness, gradually warming the freezing zone to progressively vaporize the hydrocarbon fractions, the lowest boiling fraction passing through the freezing zone when the region of maximum coldness warms sufficiently to permit it to pass as a vapor and the higher boiling fractions recondensing, recording the temperature at while each fraction leaves the freezing zone, separately passing each fraction under pressure through a heating zone, and recording the heat absorbed by each of said vaporized fractions to determine its quantity.

10. A device for analyzing gases comprising in combination a flask wherein a sample containing a gas is treated with selected reagents and subjected to selected conditions of temperature and pressure to desorb the gases, a condenser communicating with the flask and wherein undesirable fractions are removed from the gases, a trap communicating with the condenser and adapted to contain a selected reagent which will partially purify the desorbed gases when passed therethrough, a freezing trap communicating with said first trap for collecting the partially purified gases, a train of gas-wash traps communicating with the freezing trap for removing undesirable fractions from the gases, a fractionating trap communicating with the gas-wash traps in which the fractions of the gases passing through the gas-wash traps are collected, condensed and allowed to vaporize slowly in the order of their boiling points, a thermocouple to measure the temperature of the fractionating trap continuously as it warms up, a metering system communicating with the fractionating trap, a vacuum pump to maintain the metering system under reduced pressure, said system including a gauge which consists of a tubular body, a filament mounted in the body exchanging heat with the gaseous fractions, said body having an orifice behind the filament through which the gaseous fractions continuously pass and which retards their flow enough to create sufficient pressure to cause a measurable amount of heat to be exchanged between the gas and the filament, an auxiliary vacuum pump connected in the system in advance of the gauge for building up a momentary pressure around the filament as each fraction passes through the body, and a modified Wheatstone bridge circuit including a recording potentiometer having a rheostat and in which the filament is a part, the filament being connected with said rheostat whereby heat gains or losses of the filament will be indicated on the potentiometer.

11. A device for analyzing gases comprising in combination a flask wherein a sample containing a gas is treated with selected reagents and subjected to selected conditions of temperature and pressure to desorb the gases, a heating bath to maintain the flask at a selected temperature, a vacuum pump to maintain the flask at a selected pressure, a condenser communicating with the flask and wherein undesirable fractions are removed from the gases, means for circulating a heating or cooling medium through the condenser, a trap communicating with the condenser and adapted to contain a selected reagent which will partially purify the desorbed gases when passed therethrough, a freezing trap communicating with said first trap for collecting the partially purified gases, a train of gas-wash traps communicating with the freezing trap for removing undesirable fractions from the gases, a fractionating trap communicating with the gas-wash traps in which the fractions of the gases passing through the gas-wash traps are collected, condensed and allowed to vaporize slowly in the order of their boiling points, a thermocouple to measure the temperature of the fractionating trap continuously as it warms up, a metering system communicating with the fractionating trap, a vacuum pump to maintain the metering system under reduced pressure, said system including a gauge which consists of a tubular body, a filament mounted in the body exchanging heat with the gaseous fractions, said body having an orifice behind the filament through which the gaseous fractions continuously pass and which retards their flow enough to create sufficient pressure to cause a measurable amount of heat to be exchanged between the gas and the filament, an auxiliary vacuum pump connected in the system in advance of the gauge for building up a momentary pressure around the filament as each fraction passes through the body, and a modified Wheatstone bridge circuit including a recording potentiometer having a rheostat and in which the filament is a part, the filament being connected with the said rheostat whereby heat gains or losses of the filament will be indicated on the potentiometer.

12. An apparatus for making geochemical analyses comprising a container adapted to receive a substance containing hydrocarbon fractions, means for desorbing and collecting gases and vapors from the substance, means including a freezing trap for separating hydrocarbon fractions from other gases and vapors and for purifying said hydrocarbon fractions, means for chilling the freezing trap so that the purified hydrocarbon vapors will collect therein, the arrangement being such that the temperature of the trap may be raised gradually to permit the hydrocarbon vapors to fractionally distill therefrom, means for recording the temperature at which each fraction distills from the trap, a discharge passage for conducting the hydrocarbon fractions away from the trap, a plug in the passage having an orifice of capillary dimensions, a heating element in the passage between the freezing trap and the plug, a pump for pumping each fraction under pressure about the heating element and through the orifice in the plug, and means for recording the heat absorbed from the heating element by the fractions.

13. The method of gas analysis which includes the step of separating the gas into several constituents differing from each other in boiling point, and passing each such constituent separately through a thermal transfer zone and determining its quantity by measuring quantitatively the heat transmitted thereby in said zone.

14. A method of analyzing the gases in a solid comprising the steps of desorbing the gas from the solid at an elevated temperature and under reduced pressure, collecting the desorbed gas, purifying the gas, separating the purified gas sample into its constituents in the order of their boiling points, passing each constituent separately through a thermal transfer zone, and measuring the heat transmitting property of the constituents as an index of the quantity of the constituents passed through the said zone.

CECIL T. LANGFORD.
DAVID H. McKELLAR.
HERBERT T. DAVIDSON.

REFERENCES CITED

The following references are of record in the file of this patent:

UNITED STATES PATENTS

| Number | Name | Date |
| --- | --- | --- |
| 1,272,059 | Lacy | July 9, 1918 |
| 1,845,247 | Davidson | Feb. 16, 1932 |
| 2,039,889 | De Baufre | May 5, 1936 |
| 2,042,646 | Willenborg | June 2, 1936 |
| 2,212,681 | Dunn | Aug. 27, 1940 |
| 2,252,739 | Stoever | Aug. 19, 1941 |
| 2,287,101 | Horvitz | June 23, 1942 |
| 2,241,555 | Krogh et al. | May 13, 1941 |
| 1,819,986 | Brown | Aug. 18, 1931 |
| 2,009,814 | Podbielniak | July 30, 1935 |
| 2,037,409 | Duvander | Apr. 14, 1936 |
| 2,117,139 | Horvitz | Oct. 24, 1939 |
| 2,170,435 | Sweeney | Aug. 22, 1939 |
| 2,241,555 | Krogh, et al. | May 13, 1941 |
| 1,314,249 | Crowell, Jr. | Aug. 26, 1919 |